US008160732B2

(12) United States Patent
Kazama et al.

(10) Patent No.: US 8,160,732 B2
(45) Date of Patent: Apr. 17, 2012

(54) NOISE SUPPRESSING METHOD AND NOISE SUPPRESSING APPARATUS

(75) Inventors: Michiko Kazama, Tokyo (JP); Mikio Tohyama, Fujisawa (JP); Koji Kushida, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1188 days.

(21) Appl. No.: 11/914,550

(22) PCT Filed: May 17, 2006

(86) PCT No.: PCT/JP2006/309867

§ 371 (c)(1), (2), (4) Date: Nov. 15, 2007

(87) PCT Pub. No.: WO2006/123721

PCT Pub. Date: Nov. 23, 2006

(65) Prior Publication Data

US 2008/0192956 A1 Aug. 14, 2008

(30) Foreign Application Priority Data

May 17, 2005 (JP) ................................ 2005-144744

(51) Int. Cl.
*G06F 17/00* (2006.01)
*H04B 15/00* (2006.01)

(52) U.S. Cl. ........................................ 700/94; 381/94.7

(58) Field of Classification Search ................. 381/94.7, 381/94.2, 94.8; 700/94
See application file for complete search history.

(56) References Cited

U.S. PATENT DOCUMENTS 6,671,667 B1 12/2003 Chandran et al.
7,209,567 B1 * 4/2007 Kozel et al. .................. 381/94.3
2006/0200344 A1 * 9/2006 Kosek et al. .................. 704/226

FOREIGN PATENT DOCUMENTS

EP 0751491 1/1997
EP 0992978 4/2000
JP 11-003094 1/1999

(Continued)

OTHER PUBLICATIONS

Kitaoka, N. et al, "Speech Recognition Under Noisy Environments Using Spectral Subtraction With Smoothing of Time Direction", The Transactions of the Institute of Electronics, Information and Communication Engineers D-II, Feb. 2000, vol. J83-D-II, No. 2, pp. 500-508.
Gustafsson, Harald et al., Member, IEEE, Spectral Subtraction Using Reduced Delay Convolution and Adaptive Averaging, IEEE Transactions on Speech and Audio Processing, IEEE Service Center, New York, NY US, vol. 9, No. 8, Nov. 2001.

*Primary Examiner* — Davetta W Goins
*Assistant Examiner* — Joseph Saunders, Jr.
(74) *Attorney, Agent, or Firm* — Morrison & Foerster LLP

(57) ABSTRACT

In a method for suppressing a noise by the spectrum subtraction method, it is possible to improve the noise suppression capability by simultaneously obtaining a frequency resolution required for the noise estimation spectrum and a temporal resolution required for the noise suppression spectrum. The signal length of an observation signal cut out for analyzing the spectrum of the observation signal used for estimation calculation of the noise spectrum is set longer than the signal length of an observation signal cut out for analyzing the spectrum of the observation signal as a value to be subtracted for performing subtraction with the noise spectrum.

12 Claims, 7 Drawing Sheets

FOREIGN PATENT DOCUMENTS

| | | |
|---|---|---|
| JP | 2002-014694 | 1/2002 |
| JP | 2003-223186 | 8/2003 |
| JP | 2004-109906 | 4/2004 |
| JP | 3591068 | 9/2004 |
| JP | 2005-077731 | 3/2005 |
| WO | WO-99/50825 | 10/1999 |

* cited by examiner

NOISE SUPPRESSING METHOD AND NOISE SUPPRESSING APPARATUS

TECHNICAL FIELD

The present invention relates to a method and apparatus for suppressing noise by a spectrum subtraction method, which are increased in noise suppression performance.

BACKGROUND ART

The spectrum subtraction method is one of various techniques for suppressing noise that is included in a sound. The spectrum subtraction method determines a spectrum of an observation signal in which noise is superimposed on a sound (hereinafter referred to as "observation signal spectrum"), estimates a spectrum of noise (hereinafter referred to as "noise spectrum") from the observation signal spectrum, and obtains a spectrum of a noise-suppressed sound (hereinafter referred to as "sound spectrum") by subtracting the noise spectrum from the observation signal spectrum. The spectrum subtraction method then produces a noise-suppressed sound by converting the sound spectrum into a signal in the time domain.

Examples of conventional techniques that include the spectrum subtraction technique are described in the following patent documents:

[Patent document 1] JP-A-11-3094

[Patent document 2] JP-A-2002-14694

[Patent document 3] JP-A-2003-223186

In the conventional spectrum subtraction method, a common observation signal spectrum is used as an observation signal spectrum used for estimation-calculating a noise spectrum (hereinafter referred to as "noise estimation spectrum") and as an observation signal spectrum as a minuend from which to subtract the noise spectrum (hereinafter referred to as "noise suppression spectrum").

DISCLOSURE OF THE INVENTION

Problems to Be Solved By the Invention

Noise as a subject of suppression of the spectrum subtraction method is noise that does not vary much in time, such as stationary noise. Therefore, as long as the noise estimation spectrum is concerned, the frequency resolution is more important than the time resolution. In contrast, a sound as a subject of extraction of the spectrum subtraction method is a signal that varies much in time. Therefore, as long as the noise suppression spectrum is concerned, it is important that the time resolution be high. However, since a common observation signal spectrum is used as a noise estimation spectrum and as a noise suppression spectrum, the conventional spectrum subtraction method cannot satisfy both of frequency resolution that is necessary for the noise estimation spectrum and time resolution that is necessary for the noise suppression spectrum. As such, the conventional spectrum subtraction method is not sufficiently high in noise suppression performance.

The present invention has been made in view of the above points, and an object of the invention is therefore to provide a noise suppression method and a noise suppression apparatus which satisfy both of frequency resolution that is necessary for a noise estimation spectrum and time resolution that is necessary for a noise suppression spectrum and hence is increased in noise suppression performance.

Means for Solving the Problems

A noise suppressing method according to the invention for obtaining, from an observation signal in which noise is superimposed on a sound, a sound in which the noise is suppressed comprises the steps of extracting a second observation signal from the observation signal; analyzing a spectrum of the second observation signal; estimation-calculating a noise spectrum on the basis of the spectrum of the second observation signal; extracting a first observation signal from the observation signal; analyzing a spectrum of the first observation signal; subtracting the noise spectrum from the spectrum of the first observation signal; and converting a sound spectrum into a signal in the time domain, wherein a signal length (time window length) of the second observation signal is longer than that of the first observation signal.

This noise suppressing method according to the invention can increase the frequency resolution that is necessary for a noise estimation spectrum, because the signal length of an observation signal that is extracted to analyze its spectrum to be used for estimation-calculating a noise spectrum is set relatively long. Furthermore, the noise suppressing method can increase the time resolution that is necessary for a noise suppression spectrum, because the signal length of an observation signal that is extracted to analyze its spectrum as a minuend from which to subtract a noise spectrum is set relatively short. As a result, both of frequency resolution that is necessary for a noise estimation spectrum and time resolution that is necessary for a noise suppression spectrum can be satisfied and hence the noise suppression performance can be increased.

A noise suppressing method according to the invention, which is a more specific version, comprises the steps of extracting a part an observation signal that progresses with time and in which noise is superimposed on a sound, every time a prescribed interval of time with which the observation signal progresses elapses, in a first signal length that is longer than or equal to the prescribed time interval; analyzing, as a first spectrum, a spectrum of the observation signal that has been extracted in the first signal length; extracting a part of the observation signal every time the prescribed time interval or a proper time elapses in a second signal length that is longer than the first signal length in such a manner that its head coincides with a head of the observation signal that is extracted in the first signal length; analyzing, as a second spectrum, a spectrum of the observation signal that has been extracted in the second signal length; estimation-calculating a spectrum of noise included in the observation signal on the basis of the second spectrum; subtracting the noise spectrum from the first spectrum every time the prescribed time interval elapses, to calculate a noise-suppressed sound spectrum; converting the calculated sound spectrum into a signal in the time domain every time the prescribed time interval elapses; and obtaining a continuous noise-suppressed sound by connecting the converted time-domain signals to each other.

This noise suppressing method according to the invention comprises the steps of smoothing-processing the second spectrum, and estimation-calculating a noise spectrum on the basis of a smoothing-processed second spectrum. Alternatively, the subtracting step is executed after the estimated noise spectrum is subjected to smoothing processing. By virtue of the smoothing processing, the substantial frequency resolution of the noise spectrum is made equal to (or close to) that of the first spectrum. The above steps of calculating a noise estimation spectrum at a high resolution using long-term data and smoothing it increase the accuracy (effectiveness) of each subtraction result (sound spectrum data).

In the above noise suppressing method according to the invention, the estimation-calculating step comprises the substeps of smoothing-processing the second spectrum; comparing a smoothing-processed second spectrum with the second spectrum that has not been smoothing-processed; choosing larger values at respective frequency points in the comparing substep, to eliminate dips in the second spectrum; and estimation-calculating a noise spectrum on the basis of a dip-eliminated second spectrum. Alternatively, the subtracting step comprises the substeps of smoothing-processing the estimated noise spectrum; comparing a smoothing-processed noise spectrum with the noise spectrum that has not been smoothing-processed; choosing larger values at respective frequency points in the comparing substep, to eliminate dips in the noise spectrum; and subtracting a dip-eliminated noise spectrum from the first spectrum. When a spectrum of an observation signal to be used for estimation-calculating a noise spectrum is analyzed, large dips occur in a resulting spectrum and may result in processing noise (i.e., noise that is newly generated by signal processing; musical noise). Occurrence of processing noise can be suppressed by estimation-calculating a noise spectrum after eliminating dips from the second spectrum or subtracting a noise spectrum from the first spectrum after eliminating dips from the noise spectrum. The technique of eliminating dips from a noise spectrum or an observation signal spectrum to be used for estimation-calculating a noise spectrum can be applied to not only the case that the signal length of an observation signal that is extracted to analyze an observation signal spectrum to be used for estimation-calculating a noise spectrum is set longer than the signal length of an observation signal that is extracted to analyze an observation signal spectrum as a minuend from which to subtract a noise spectrum, but also a case that the two kinds of signal length are set identical.

The above noise suppressing method according to the invention comprises the steps of adding a zero signal having a prescribed length after an end of the observation signal that has been extracted in the first signal length so that a signal length of the observation signal to be used for the analysis of the first spectrum is made equal to the second signal length; analyzing, as a first spectrum, a spectrum of the observation signal to which the zero signal is added; subtracting the noise spectrum from the analyzed first spectrum; converting a sound spectrum that has been obtained by the subtracting step into a signal in the time domain; removing a signal having the same length as the added zero signal located after an end of the time-domain signal, to return a signal length of the time-domain signal to the first signal length; and connecting the time-domain signals to each other whose signal length is returned to the first signal length.

In the above noise suppressing method according to the invention, the prescribed time interval may be, for example, a half of the first signal length. In this case, the noise suppressing method may be such that the time-domain signal is a signal that is obtained in the first signal length every time the prescribed time interval elapses, and that the time-domain signal is multiplied by a triangular window and the time-domain signals that have been multiplied by the triangular window are added to each other sequentially and thereby connected to each other.

A noise suppressing apparatus according to the invention for obtaining a noise-suppressed sound from an observation signal in which noise is superimposed on a sound comprises a first signal extracting section for extracting a part an observation signal that progresses with time and in which noise is superimposed on a sound, every time a prescribed interval of time with which the observation signal progresses elapses, in a first signal length that is longer than or equal to the prescribed time interval; a first spectrum analyzing section for analyzing, as a first spectrum, a spectrum of the observation signal that has been extracted by the first signal extracting section; a second extracting section for extracting a part of the observation signal every time the prescribed time interval or a proper time elapses in a second signal length that is longer than the first signal length in such a manner that its head coincides with a head of the observation signal that is extracted in the first signal length; a second spectrum analyzing section for analyzing, as a second spectrum, a spectrum of the observation signal that has been extracted by the second signal extracting section; a noise spectrum estimation-calculating section for estimation-calculating a spectrum of noise included in the observation signal on the basis of the second spectrum; a subtracting section for subtracting the noise spectrum from the first spectrum every time the prescribed time interval elapses, to calculate a noise-suppressed sound spectrum; a conversion-into-time-domain section for converting the calculated sound spectrum into a signal in the time domain every time the prescribed time interval elapses; and an output combining section for obtaining a continuous noise-suppressed sound by connecting the converted time-domain signals to each other.

A noise suppressing apparatus according to the invention, which is a more specific version, comprises a first signal extracting section for extracting a part an observation signal that progresses with time and in which noise is superimposed on a sound, every time a prescribed interval of time with which the observation signal progresses elapses, in a first signal length that is longer than or equal to the prescribed time interval; a first spectrum analyzing section for analyzing, as a first spectrum, a spectrum of the observation signal that has been extracted by the first signal extracting section; a second extracting section for extracting a part of the observation signal every time the prescribed time interval or a proper time elapses in a second signal length that is longer than the first signal length in such a manner that its head coincides with a head of the observation signal that is extracted in the first signal length; a second spectrum analyzing section for analyzing, as a second spectrum, a spectrum of the observation signal that has been extracted by the second signal extracting section; a noise spectrum estimation-calculating section for estimation-calculating a spectrum of noise included in the observation signal on the basis of the second spectrum; a subtracting section for subtracting the noise spectrum from the first spectrum every time the prescribed time interval elapses, to calculate a noise-suppressed sound spectrum; a conversion-into-time-domain section for converting the calculated sound spectrum into a signal in the time domain every time the prescribed time interval elapses; and an output combining section for obtaining a continuous noise-suppressed sound by connecting the converted time-domain signals to each other.

Another noise suppressing method according to the invention for obtaining, from an observation signal in which noise is superimposed on a sound, a sound in which the noise is suppressed comprises the steps of analyzing a spectrum of the observation signal; smoothing-processing the observation signal spectrum; comparing the smoothing-processed observation signal spectrum with the observation signal spectrum that has not been smoothing-processed; choosing larger values at respective frequency points in the comparing step, to eliminate dips from the observation signal spectrum; estimation-calculating a noise spectrum on the basis of a dip-eliminated observation signal spectrum; subtracting the noise spectrum from the observation signal spectrum, to calculate a sound spectrum in which the noise is suppressed; and converting the sound spectrum into a signal in the time domain.

A further noise suppressing method according to the invention for obtaining, from an observation signal in which noise is superimposed on a sound, a sound in which the noise is suppressed comprises the steps of analyzing a spectrum of the observation signal; estimation-calculating a noise spectrum on the basis of the observation signal spectrum; smoothing-processing the estimated noise spectrum; comparing a smoothing-processed noise spectrum with the noise spectrum that has not been smoothing-processed; choosing larger values at respective frequency points in the comparing steps to eliminate dips from the noise spectrum; subtracting the noise spectrum from the observation signal spectrum, to calculate a sound spectrum in which the noise is suppressed; and converting the sound spectrum into a signal in the time domain.

DESCRIPTION OF SYMBOLS

16 . . . Frame extracting section (second signal extracting section)
18 . . . Fast Fourier transform section (second spectrum analyzing section)
22 . . . Dip eliminating section
24 . . . Smoothing processing section
28 . . . Noise estimating section (noise spectrum estimation-calculating section)
32 . . . Frame extracting section (first signal extracting section)
38 . . . Fast Fourier transform section (first spectrum analyzing section)
42 . . . Inverse fast Fourier transform section (conversion-into-time-domain section)
44 . . . Output combining section (output combining section)
60 . . . Spectrum subtracting section (subtracting section)

BEST MODE FOR CARRYING OUT THE INVENTION

Figure 1:
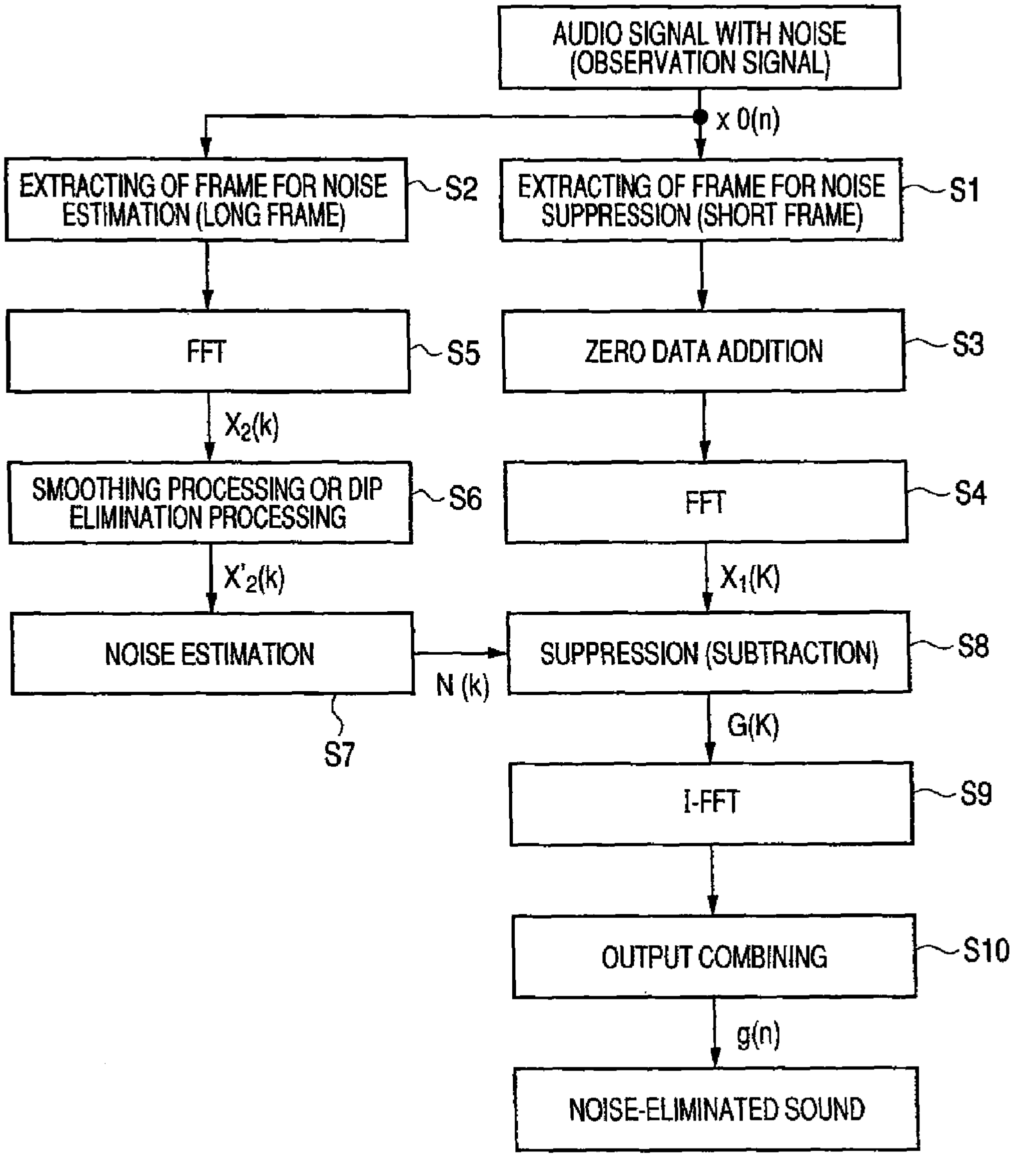
FIG. 1 is a flowchart outlining the procedure of a noise suppressing process which utilizes a noise suppression method according to the invention.
Figure 2:
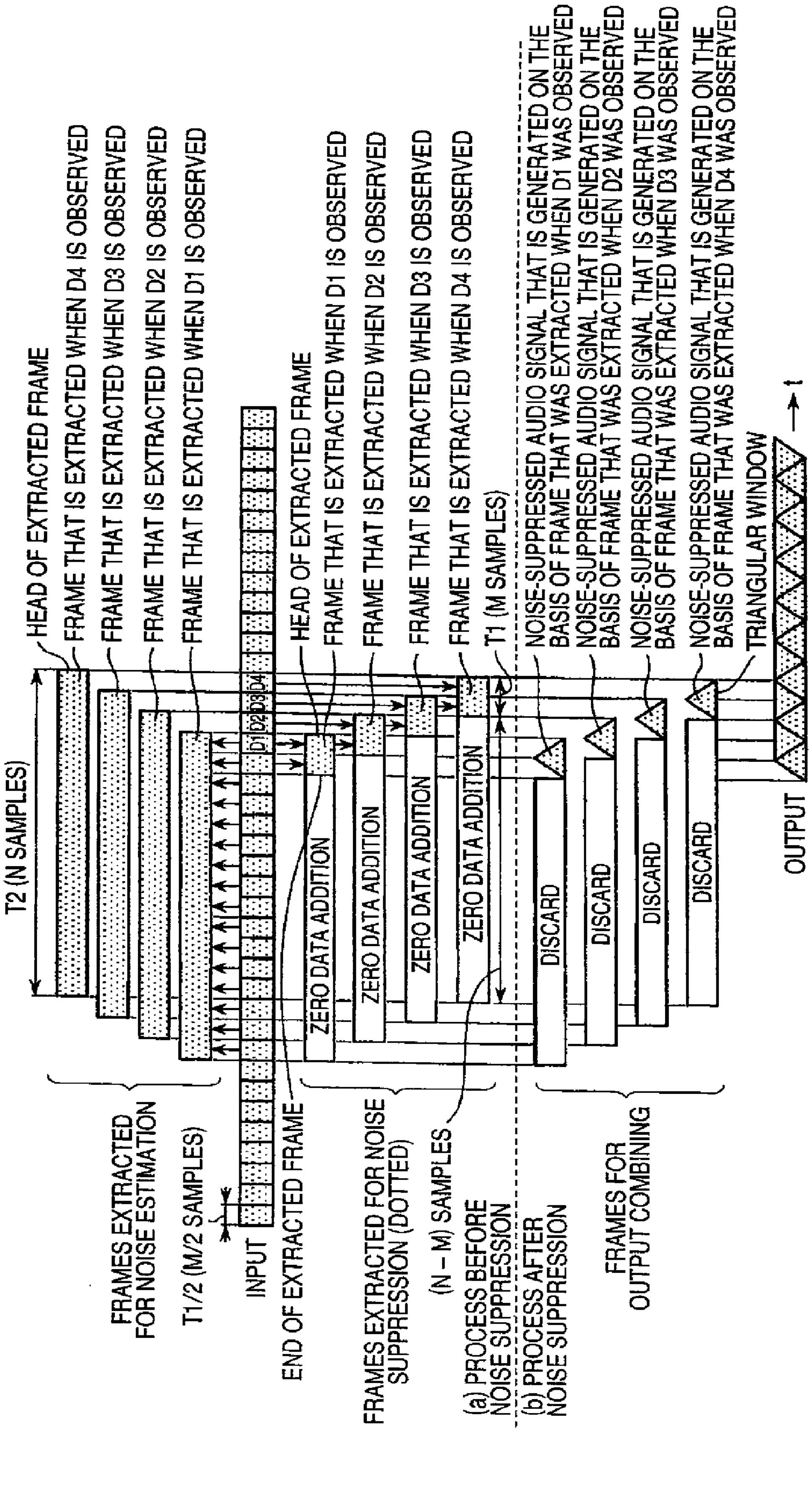
FIG. 2 is an explanatory diagram of the noise suppressing process.

Embodiments of the present invention will be hereinafter described. FIG. 1 outlines the procedure of a noise suppressing process which utilizes a noise suppression method according to the invention. FIG. 2 is an explanatory diagram of the noise suppressing process. In FIG. 1, an observation signal $x_0(n)$ (n=0, 1, 2, . . . ) as a subject of noise suppression is a sequence of samples of an audio signal that is produced by a microphone or the like and include noise (e.g., an audio signal received through a telephone communication or a signal that is input for speech recognition) and is an audio signal with noise of a target sound of a speaker that is mixed with stationary noise such as background noise. The observation signal $x_0(n)$ is subjected to frame extracting (signal extracting) in different frame lengths (signal lengths, time window lengths) for analysis of a noise suppression spectrum and for analysis of a noise suppression spectrum (S1 and S2). That is, frames for analysis of a noise suppression spectrum are extracted from the observation signal $x_0(n)$ in a relatively short frame length T1 (S1; the relatively short frame length T1 and frames that are extracted from the observation signal $x_0(n)$ in this frame length will be hereinafter referred to as "noise suppression frame length" and "noise suppression frames," respectively) and frames for analysis of a noise estimation spectrum are extracted from the observation signal $x_0(n)$ in a relatively great length T2 (S2; the relatively great frame length T2 and frames that are extracted from the observation signal $x_0(n)$ in this frame length will be hereinafter referred to as "noise estimation frame length" and "noise estimation frames," respectively). A noise suppression frame and a noise estimation frame are extracted from the observation signal (S1 and S2) repeatedly, that is, every time a half of the noise suppression frame length T1 elapses, in such a manner that the heads of the noise suppression frame and the noise estimation frame are timed with each other (i.e., observation signal samples (latest samples) of the same time point are located at the heads of the two frames). Zero data having a prescribed length (i.e., sample data whose signal values are zero, a zero signal) are added to each extracted noise suppression frame immediately after its end (its last sample), whereby the frame length is made equal to the noise estimation frame length T2 formally (in a simulated manner) (S3). This processing is performed because to subtract a noise spectrum from a noise suppression spectrum it is necessary that the numbers of data (the numbers of frequency points) of the two spectra be the same. That is, the number of data of the noise spectrum is the same as that of a noise estimation spectrum, and to equalize the number of data of the noise suppression spectrum to that of the noise estimation spectrum it is necessary to equalize the numbers of data (the numbers of samples) of the noise suppression spectrum and the noise estimation spectrum in the time domain before conversion into data in the frequency domain. Where a sound as a subject of extraction is a voice of a speaker, the noise suppression frame length T1 can be set at 20 to 32 ms, for example. Where noise as a subject of suppression is room air-conditioning noise, the noise estimation frame length T2 can be set about eight times longer than the noise suppression frame length T1 (e.g., 256 ms).

In FIG. 2, "(a) Process before noise suppression" is the above-described steps S1-S3. More specifically, every time M/2 samples of an observation signal is newly input (every time T½ elapses), latest M samples of the observation signal are extracted as a noise suppression frame (i.e., noise suppression frames are extracted with an overlap of M/2 samples) and latest N samples (N>M; in FIG. 2, N is set equal to 8M) of the observation signal are extracted as a noise estimation frame. Zero data of (N−M) samples are added after the end of each noise suppression frame, whereby the frame length of each noise suppression frame is made equal to the noise estimation frame length T2 formally.

Referring to FIG. 1, every time the data of a noise suppression frame are extracted (i.e., for each time interval corresponding to M/2 samples of the observation signal), the data of the noise suppression frame to which zero data are added are subjected to fast Fourier transform (FFT) and thereby converted into data in the frequency domain, that is, a noise suppression spectrum $X_1(k)$ (S4). On the other hand, every time the data of a noise estimation frame is extracted (i.e., for each time interval corresponding to M/2 samples of the observation signal), the data of the noise estimation frame is subjected to fast Fourier transform and thereby converted into a signal in the frequency domain, that is, a noise estimation spectrum $X_2(k)$ (S5). Every time a noise estimation spectrum $X_2(k)$ is calculated (i.e., for each time interval corresponding to M/2 samples of the observation signal), the noise estimation spectrum $X_2(k)$ is subjected to proper dip elimination processing or smoothing processing (S6). Every time the dip elimination processing or smoothing processing is performed (i.e., for each time interval corresponding to M/2 samples of the observation signal), an operation of estimating a current noise spectrum N(k) is performed on the basis of a noise estimation spectrum $X_2'(k)$ produced by the dip elimination processing or smoothing processing and estimation values of a preceding noise spectrum (S7).

Every time a noise suppression spectrum $X_1(k)$ and a noise spectrum N(k) are calculated (i.e., for each time interval corresponding to M/2 samples of the observation signal), the noise spectrum N(k) is subtracted from the noise suppression spectrum $X_1(k)$, whereby a noise-suppressed sound spectrum G(k) is calculated (S8). The sound spectrum G(k) is subjected to inverse fast Fourier transform (I-FFT) and thereby converted into a signal in the time domain, that is, an audio signal (S9). Audio signals of frames that are obtained at the time intervals of M/2 samples of the observation signal are connected to each other (S10) and output as a continuous audio signal g(n), which will be output as a sound from a speaker device, used for speech recognition processing for the speaker, or used for some other purpose.

In FIG. 2, "(b) Process after noise suppression" is step S10 (frame combining). More specifically, (N−M) tail samples corresponding to the added zero data are removed from the frame of N samples obtained by the inverse fast Fourier transform (S9), whereby a frame is obtained which has M samples as in the original state. The data of each of frames of M samples that are obtained at the time intervals of M/2 samples of the observation signal is multiplied by a triangular window (i.e., the data are given a gain characteristic that increases linearly from 0 to 1 in the first half frame of the one frame length (the time length of M samples) and decreases 1 to 0 In the second half frame). Resulting frames are added to each other with an overlap of a ½ frame, whereby a continuous audio signal is generated. As a result, a continuous audio signal is obtained which is free of disconnections or steps between the frames.

Next, an embodiment of a noise suppressing apparatus for executing the above-described noise suppressing process of FIG. 1 will be described. This embodiment is directed to a case that the following settings are made:

Sampling frequency: 16 kHz

M (noise suppression frame length T1): 512 samples (corresponds to 32 ms)

N (noise estimation frame length T2): 4,096 samples (corresponds to 256 ms)

Figure 3:
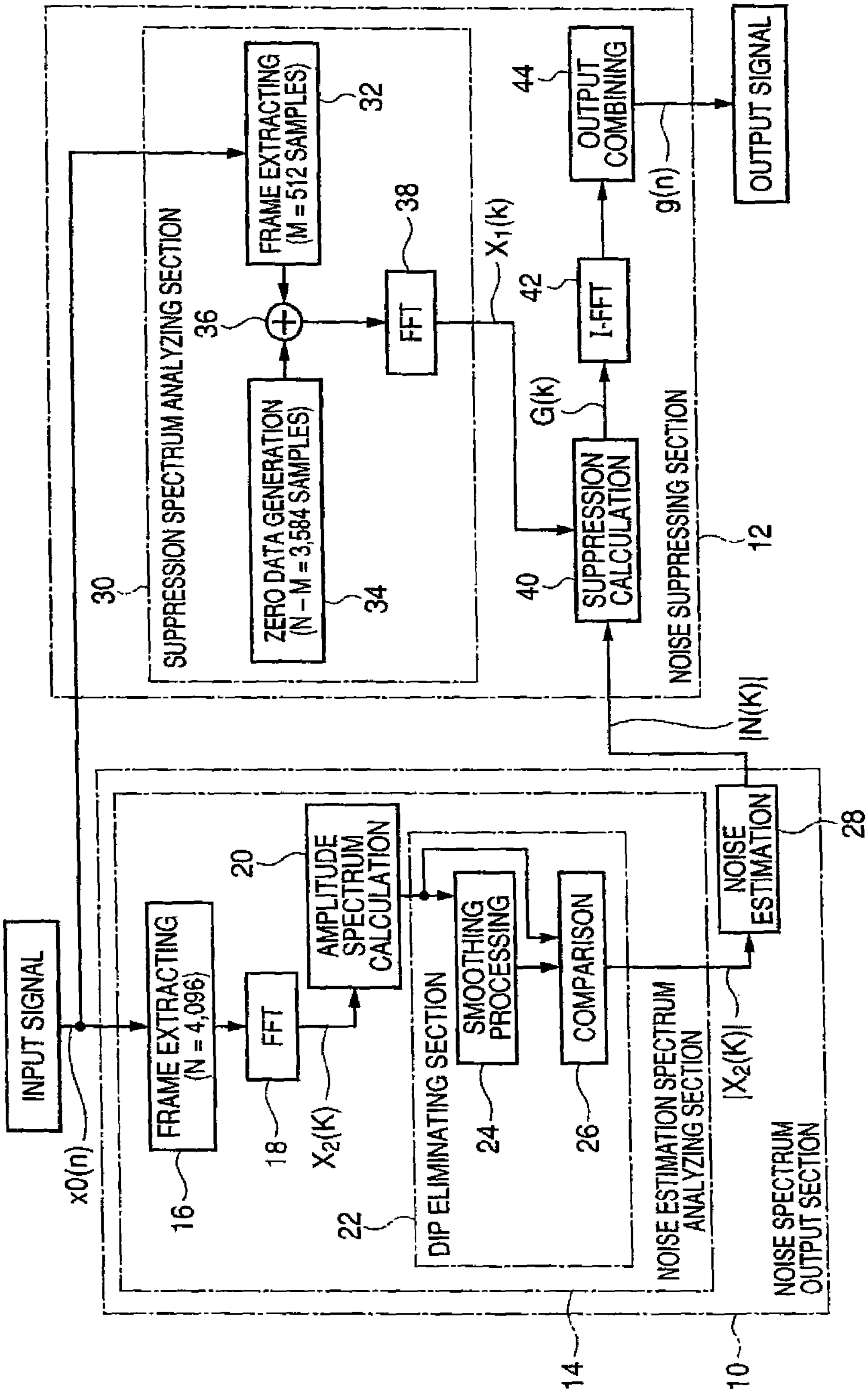
FIG. 3 shows functional blocks of an embodiment of a noise suppressing apparatus for executing the noise suppressing process of FIG. 1.

FIG. 3 shows functional blocks of the noise suppressing apparatus. An input signal (audio signal with noise) $x_0(n)$ is input to both of a noise spectrum output section 10 and a noise suppressing section 12. The audio signal with noise that is input to the noise spectrum output section 10 is first subjected to a frequency analysis for noise estimation in a noise estimation spectrum analyzing section 14. More specifically, every time an input signal of M/2 samples (256 samples) is newly input, a frame extracting section 16 extracts an input signal of latest N (4,096) samples. A fast Fourier transform section 18 performs fast Fourier transform on the extracted frame and thereby converts it into data in the frequency domain, that is, spectrum data (discrete Fourier transform data) $X_2(k)$ (k=0, 1, 2, . . . ). An amplitude spectrum calculating section 20 calculates an amplitude spectrum from the calculated spectrum data $X_2(k)$.

A dip eliminating section 22 eliminates dips in the frequency characteristic from the calculated amplitude spectrum. For example, the dip elimination processing is performed in the following manner. First, the amplitude spectrum is subjected to smoothing processing in a smoothing processing section 24. For example, the algorithm of the smoothing processing may be a moving average method, in which an amplitude value at the center of a prescribed number of consecutive frequency points (i.e., a prescribed frequency band) is replaced by an average of amplitude values at these frequency points. If the number of consecutive frequency points used in one averaging operation (i.e., the frequency bandwidth in which to calculate an average value) is set at eight, for example, the substantial frequency resolution of a smoothed amplitude spectrum (noise estimation amplitude spectrum) becomes equal to that of a noise suppression amplitude spectrum. The average calculation and the amplitude value replacement are performed while the frequency point is shifted by one point each time, whereby an amplitude spectrum is calculated that is smoothed over the entire frequency band.

Instead of the moving average method, a moving median method may be employed as an algorithm of the smoothing processing of the smoothing processing section 24. In the moving median method, an amplitude value at the center of a prescribed number of (e.g., eight) consecutive frequency points (i.e., a prescribed frequency band) is replaced by a median of amplitude values at these frequency points. The extraction of a median amplitude value and the amplitude value replacement are performed while the frequency point is shifted by one point each time, whereby an amplitude spectrum is calculated that is smoothed over the entire frequency band.

In the dip eliminating section 22, a comparing section 26 compares the amplitude spectrum that has been smoothed by the smoothing processing section 24 with the unsmoothed amplitude spectrum and thereby chooses larger values at respective frequency points. The comparing section 26 thus outputs, as a noise estimation amplitude spectrum $|X_2(k)|$, a continuous characteristic that is a connection of the chosen values. A dip-eliminated noise estimation amplitude spectrum $|X_2(k)|$ is thus obtained.

Figure 4:
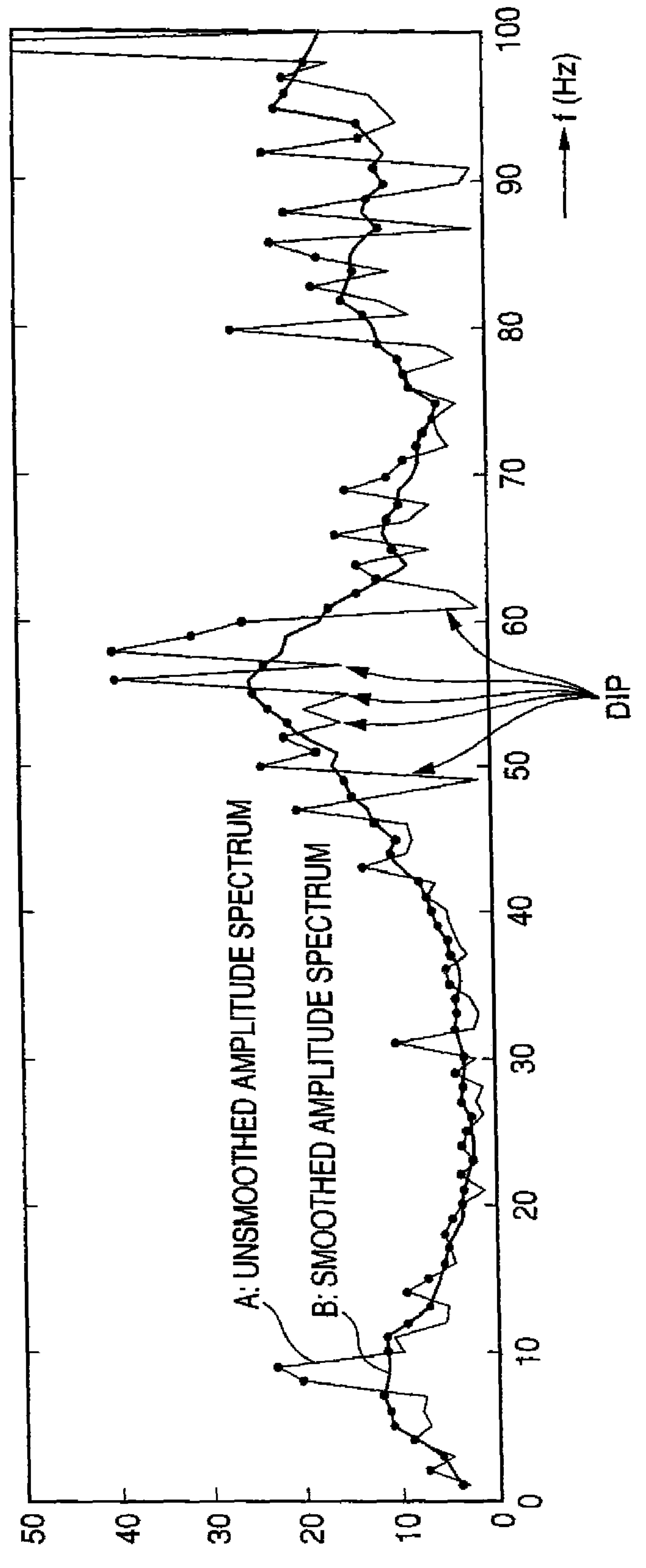
FIG. 4 is a spectrum diagram showing the operation of a dip eliminating section 22 shown in FIG. 2.

FIG. 4 shows the operation of the dip eliminating section 22 (only part (frequency range: 1 to 100 Hz) of the entire amplitude spectrum is shown in an enlarged manner). An unsmoothed amplitude spectrum A and an amplitude spectrum B that has been smoothed by the moving average method are compared with each other and larger values (indicated by dots) are chosen at respective frequency points. And a continuous characteristic that is a connection of the chosen values is output from the dip eliminating section 22 as a dip-eliminated amplitude spectrum. As a result, dips (valleys) are removed from the amplitude spectrum A and processing noise is reduced.

Alternatively, the comparing section 26 shown in FIG. 3 may be omitted (i.e., only the smoothing processing section 24 is provided in place of the dip-eliminating section 22). In this case, an output signal of the smoothing processing section 24 (i.e., an amplitude spectrum that has been smoothed by the moving average method, the moving median method, or the like) is output from the noise estimation spectrum analyzing section 14 as a noise estimation amplitude spectrum $|X_2(k)|$.

Referring to FIG. 3, the noise estimating section 28 estimation-calculates an amplitude spectrum of noise included in the observation signal (hereinafter referred to as "noise amplitude spectrum") according to an arbitrary estimation algorithm on the basis of the dip-eliminated or smoothed amplitude spectrum. The dip eliminating section 22 (or the smoothing processing section 24 that replaces the dip eliminating section 22) may be disposed downstream of the noise estimating section 28 rather than upstream of it.

On the other hand, in a suppression spectrum analyzing section 30, the input signal (audio signal with noise) $x_0(n)$ that is input to the noise suppressing section 12 is first subjected to a frequency analysis for noise suppression (i.e., for generation of an observation signal spectrum as a minuend from which to subtract a noise spectrum). More specifically, every time an input signal of M/2 samples (256 samples) is newly input, a frame extracting section 32 extracts an input signal of latest M (512) samples. A zero data generating section 34 generates zero data of (N−M) samples (3,584 samples). An adding section 36 adds the zero data of (N−M) samples after the end of the input signal of M samples that has been extracted by the frame extracting section 32, and thereby equalizes the length of the extracted input signal to the noise estimation frame length T2 formally. A fast Fourier transform section 38 performs fast Fourier transform on the zero-data-added data and thereby converts the data into data in the frequency domain, that is, spectrum data (discrete Fourier transform data) $X_1(k)$ (k=0, 1, 2, . . . ), which are output as a noise suppression spectrum.

A suppression calculating section 40 performs noise suppression processing according to an arbitrary suppression algorithm on the basis of the noise suppression spectrum $X_1(k)$ that is output from the suppression spectrum analyzing section 30 and the noise amplitude spectrum $|N(k)|$ that is output from the noise spectrum output section 10. A noise-suppressed sound spectrum G(k) that is output from the suppression calculating section 40 is subjected to inverse fast Fourier transform in an inverse fast Fourier transform section 42 and thereby returned to a signal in the time domain. Since the signal that is output from the inverse fast Fourier transform section 42 is data of N (4,096) samples, the lower (N−M) samples (3,584 samples) corresponding to the zero data are removed from the signal by an output combining section 44, whereby data of M (512) samples (i.e., samples of the original number) are obtained. Frames are connected to each other, whereby a continuous audio signal g(n) is output.

Figure 5:
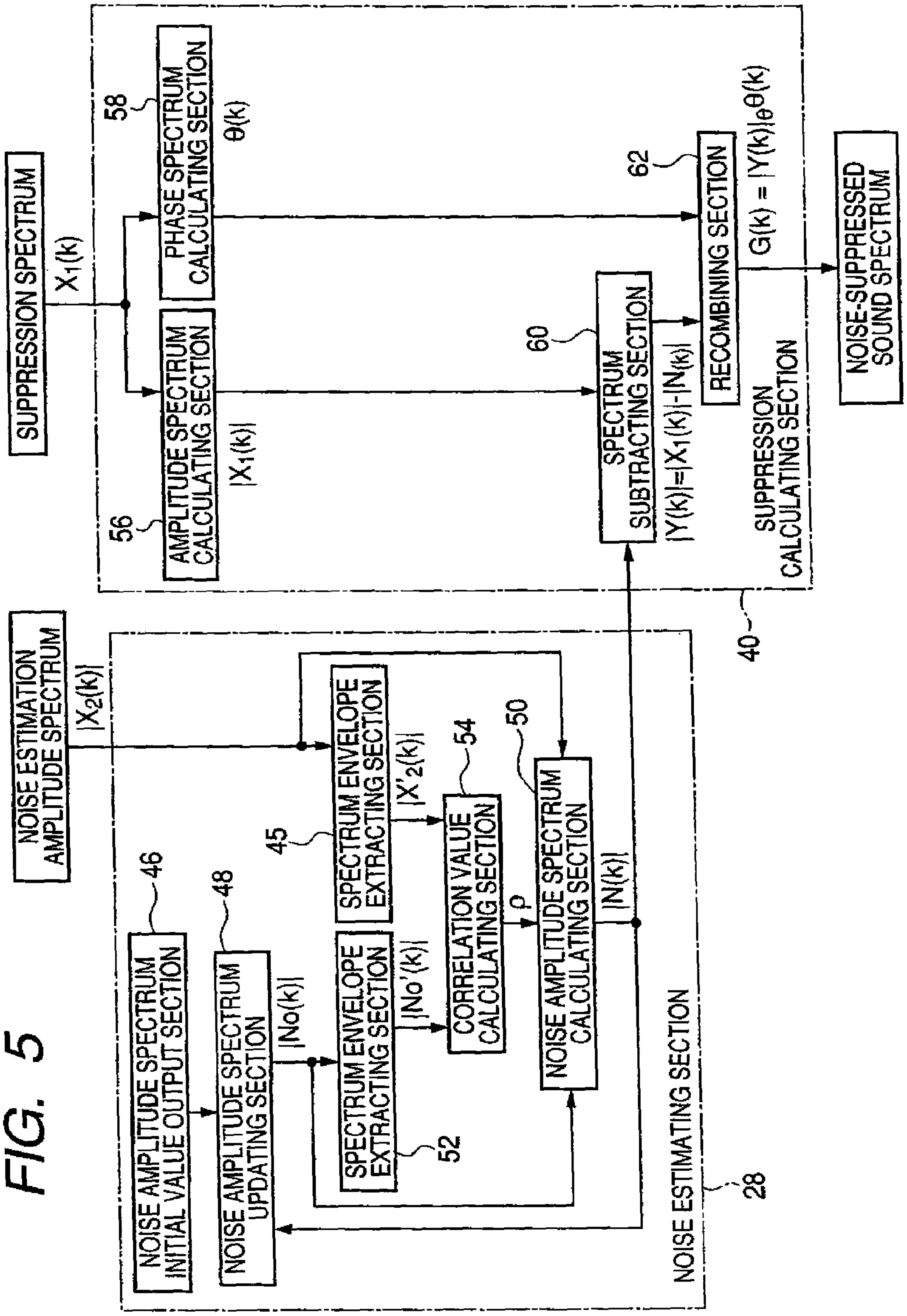
FIG. 5 is a block diagram showing specific examples of a noise estimating section 28 and a suppression calculating section 40.

FIG. 5 shows specific examples of the noise estimating section 28 and the suppression calculating section 40. In the noise estimating section 28, a spectrum envelope extracting section 45 extracts an envelope $|X_2'(k)|$ of the noise estimation amplitude spectrum $|X_2(k)|$ that is output from the noise estimation spectrum analyzing section 14 shown in FIG. 3 by eliminating fine peak/valley characteristics included in the noise estimation amplitude spectrum $|X_2(k)|$, for the following reason. If the noise estimation amplitude spectrum $|X_2(k)|$ itself is used in calculating a correlation value (described later), the spectrum correlation value becomes too small and discrimination between sound intervals and noise intervals becomes unclear. It is expected that an average spectrum of noise has a smooth distribution that is almost uniform over a wide band if the average spectrum is obtained by repeating observations for a long time. However, in a short period, a spectrum of noise has a variation (peaks and valleys). On the other hand, in contrast to noise, a frequency characteristic of a sound has large amplitude values in particular frequency bands and is not uniform over the entire frequency band. In this specific example, a noise spectrum is estimated by discriminating noise that is distributed uniformly over the entire frequency band and a sound having large amplitude values in particular frequency bands using the magnitude of a spectrum correlation value. Therefore, fine peak/valley characteristics of the noise amplitude spectrum are eliminated.

For example, the spectrum envelope extracting section 45 extracts an envelope by performing lowpass filter processing on the noise estimation amplitude spectrum $|X_2(k)|$ which is regarded as a time waveform. For example, the lowpass filter processing may be such that the noise estimation amplitude spectrum $|X_2(k)|$ is directly input to a lowpass filter or is subjected to moving average processing in the frequency axis direction. Another method for extracting an envelope $|X_2'(k)|$ of the noise estimation amplitude spectrum $|X_2(k)|$ by the spectrum envelope extracting section 45 is such that the noise estimation amplitude spectrum $|X_2(k)|$ is further subjected to Fourier transform (cepstrum analysis).

A noise amplitude spectrum initial value output section 46 outputs initial values of a noise amplitude spectrum. That is, initial values are set because immediately after activation of this apparatus there are no noise amplitude spectrum data to be referred to. Examples of the method for setting noise amplitude spectrum initial values are as follows:

(Method 1) Data of only background noise (i.e., mixed with no sound), which are input immediately after activation, are subjected to Fourier transform, and amplitude spectrum data calculated from Fourier-transformed data are set as noise amplitude spectrum initial values.

(Method 2) Amplitude spectrum data corresponding to background noise are held in a memory in advance, and read out and set as noise amplitude spectrum initial values at the time of activation. Alternatively, envelope data of amplitude spectrum data corresponding to background noise are held in a memory in advance, and read out and set as initial values of noise amplitude spectrum envelope data at the time of activation.

(Method 3) Amplitude spectrum data of white noise or pink noise are set as noise amplitude spectrum initial values.

A noise amplitude spectrum updating section 48 sequentially receives noise amplitude spectra $|N(k)|$ that are calculated for respective half frames (T½)by a noise amplitude spectrum calculating section 50 (described later). The noise amplitude spectrum updating section 48 delays the noise amplitude spectra $|N(k)|$ by a half frame and sequentially outputs them as noise amplitude spectra $|N_0(k)|$ that have been estimated for observation signals in signal intervals of preceding observations (a half frame earlier). Immediately after activation when no noise amplitude spectrum $|N(k)|$ has been estimated yet, the noise amplitude spectrum updating section 48 outputs the noise amplitude spectrum initial values that are set by the noise amplitude spectrum initial value output section 46. A spectrum envelope extracting section 52 extracts an envelope $|N_0'(k)|$ of the noise amplitude spectrum $|N_0(k)|$ by the same method as used by the spectrum envelope extracting section 45.

A correlation value calculating section 54 calculates a correlation value (correlation coefficient) ρ of the noise estimation amplitude spectrum envelope $|X_2'(k)|$ of the current frame that has been extracted by the spectrum envelope extracting section 45 and the noise amplitude spectrum envelope $|N_0'(k)|$ that has been extracted by the spectrum envelope extracting section 52. With the noise estimation amplitude spectrum envelope $|X_2'(k)|$ and the noise amplitude spectrum envelope $|N_0'(k)|$ written as $$|X_2'(k)|=x_k(k=1,2, \ldots K); \text{ and}$$

$$|N_0'(k)|=y_k(k=1,2, \ldots K),$$

the correlation value ρ is calculated according to the following Equation (1):

[Formula 1]

$$\rho = \frac{C_{XY}}{\sqrt{C_{XX}}\sqrt{C_{YY}}} \tag{1}$$

where $$C_{XY} = \sum_{k=1}^{K}\left[\left(x_k - \left(\sum_{k=1}^{K} x_k\right)\Big/K\right)\left(y_k - \left(\sum_{k=1}^{K} y_k\right)\Big/K\right)\right]$$

$$C_{XX} = \sum_{k=1}^{K}\left(x_k - \left(\sum_{k=1}^{K} x_k\right)\Big/K\right)^2$$

$$C_{YY} = \sum_{k=1}^{K}\left(y_k - \left(\sum_{k=1}^{K} y_k\right)\Big/K\right)^2$$

The noise amplitude spectrum calculating section 50 calculates a noise amplitude spectrum $|N(k)|$ for the audio signal in the signal interval of the current observation according to the following Equation (2) using the calculated correlation value ρ:

$$|N(k)|=[1-\{\rho^l/(1+\rho^l)\}^m]\cdot|N_0(k)|+\{\rho^l/(1+\rho^l)\}^m\cdot|X_2(k)| \tag{2}$$

where $|N(k)|$: the noise amplitude spectrum that is estimated for the audio signal of the frame being observed;

$|N_0(k)|$: the noise amplitude spectrum that was estimated for the audio signal of the frame that was observed last time (a half frame earlier);

$|X_2(k)|$: the noise estimation amplitude spectrum of the frame being observed;

ρ: the correlation value of the envelope of the audio signal spectrum of the frame being observed and the envelope of the noise spectrum that was estimated for the audio signal of the frame that was observed last time; and l and m: constants ($l \geqq 1$, $m \geqq 0$).

Equation (2) is to estimate a new noise amplitude spectrum $|N(k)|$ by adding together the noise amplitude spectrum $|N_0(k)|$ estimated last time (a half frame (T½) earlier) and the noise estimation amplitude spectrum $|X_2(k)|$ calculated this time at a ratio that depends on the calculated correlation value ρ. More specifically, when the correlation value ρ is small, it is judged that the sound component is dominant in the input signal (i.e., a sound-existing interval). Therefore, addition is made in such a manner that the proportion of the noise amplitude spectrum $|N_0(k)|$ estimated last time is set high and that of the noise estimation amplitude spectrum $|X_2(k)|$ calculated this time is set low. That is, the noise amplitude spectrum $|N(k)|$ is prevented from varying being influenced by the sound component. In contrast, when the correlation value ρ is large, it is judged that the sound component is a minor part of the input signal (i.e., a silent interval). Therefore, addition is made in such a manner that the proportion of the noise amplitude spectrum $|N_0(k)|$ estimated last time is set low and that of the noise estimation amplitude spectrum $|X_2(k)|$ calculated this time is set high. That is, the noise amplitude spectrum $|N(k)|$ is caused to vary so as to follow a gentle variation of stationary noise. When the correlation value ρ is infinitely close to 1, the noise amplitude spectrum $|N_0(k)|$ estimated last time and the noise estimation amplitude spectrum $|X_2(k)|$ calculated this time are added together at an even ratio (0.5:0.5). In this manner, the noise amplitude spectrum is updated mainly in silent intervals.

In Equation (2), the parameter l is a constant for adjusting the sensitivity to a small correlation value. The degree of updating of noise amplitude spectrum estimation values of low correlation becomes smaller as the l-value increases. In Equation (2), the parameter m is a constant for adjusting the degree of updating. The degree of updating decreases as the m-value increases.

In the suppression calculating section 40, the noise suppression spectrum $X_1(k)$ is input to an amplitude spectrum calculating section 56 and a phase spectrum calculating section 58. The amplitude spectrum calculating section 56 calculates an amplitude spectrum $|X_1(k)|$ of the noise suppression spectrum $X_1(k)$ according to the following Equation (3):

$$|X_1(k)|=\{X_R(k)^2+X_I(k)^2\}^{1/2} \tag{3}$$

where $X_R(k)$: the real part of $X_1(k)$; and $X_1(k)$: the imaginary part of $X_1(k)$.

The phase spectrum calculating section 58 calculates a phase spectrum θ(k) of the noise suppression spectrum $X_1(k)$ according to the following Equation (4):

$$\theta(k)=\tan^{-1}\{X_1(k)/X_R(k)\} \tag{4}$$

A spectrum subtracting section 60 calculates a noise-amplitude-spectrum-eliminated amplitude spectrum $|Y(k)|$ of the audio signal of the current frame by subtracting the noise amplitude spectrum $|N(k)|$ of the current frame calculated by the noise estimating section 28 from the noise suppression amplitude spectrum $|X_1(k)|$ of the current frame calculated by the amplitude spectrum calculating section 56 according to the following Equation (5):

$$|Y(k)|=|X_1(k)|-|N(k)| \tag{5}$$

If $|X_1(k)|-|N(k)|$ becomes negative at certain frequency points, it means over-subtraction. It is preferable that the difference $|Y(k)|$ being a negative value not be kept as it is but be changed to 0.

A recombining section 62 recombines the amplitude spectrum $|Y(k)|$ of the audio signal of the current frame that has been calculated by the spectrum subtracting section 60 and the phase spectrum θ(k) of the noise suppression spectrum $X_1(k)$ of the current frame that has been calculated by the phase spectrum calculating section 58 and thereby generates a complex spectrum given by the following Equation (6), that is, a noise-suppressed sound spectrum G(k):

$$G(k)=|Y(k)|e^{\theta(k)} \tag{6}$$

The generated sound spectrum G(k) is supplied to the inverse fast Fourier transform section 42 shown in FIG. 3.

Figure 6:
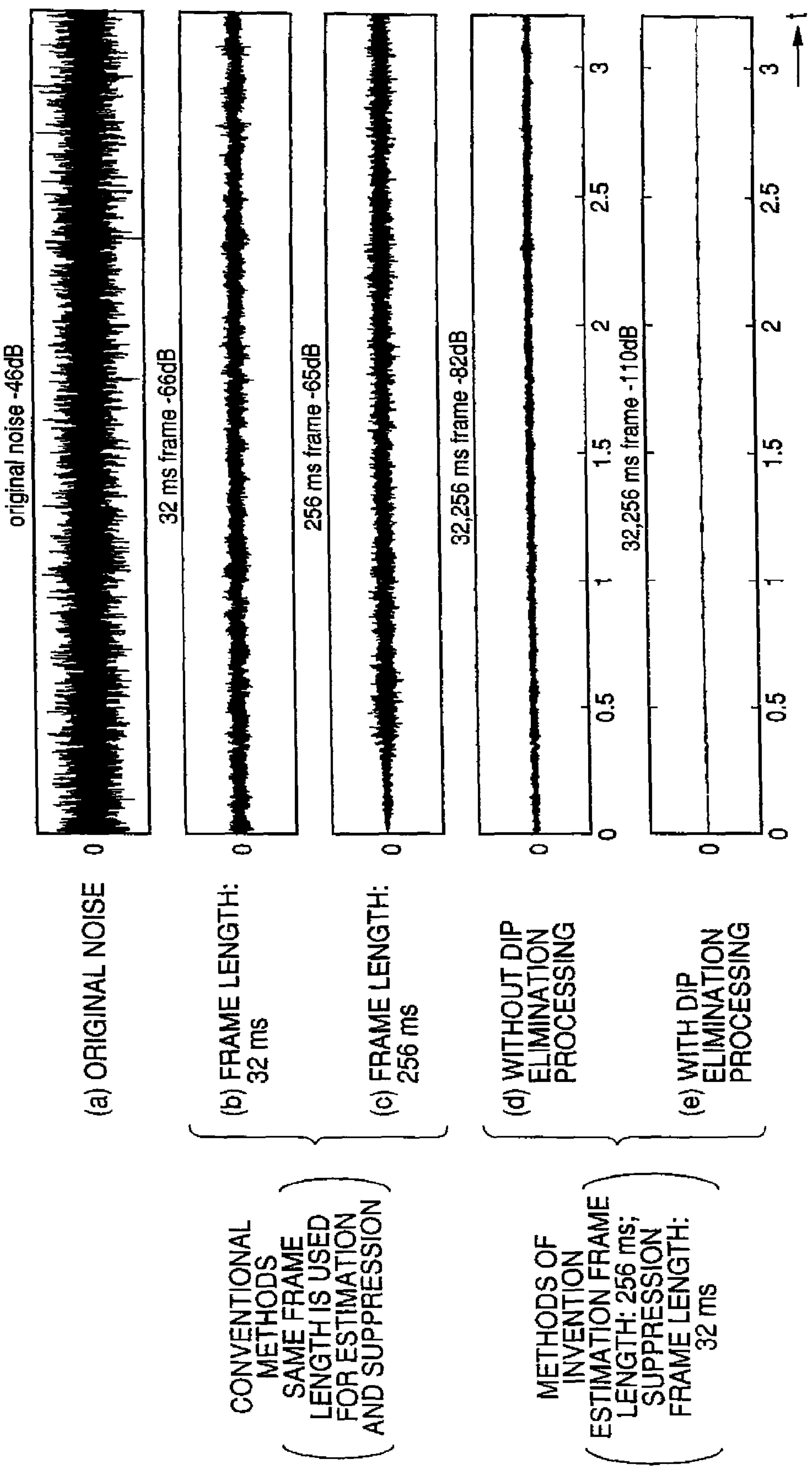
FIG. 6 is a waveform diagram showing differences between output waveforms that were obtained when stationary noise was input in a conventional spectrum subtraction method and the spectrum subtraction method according to the invention.

FIG. 6 shows output waveforms that were obtained when stationary noise was input to noise suppressing apparatus. Symbol (a) denotes original noise. Symbols (b) and (c) denote noise-suppressed outputs of a conventional spectrum subtraction method in which the length of frames extracted from an observation signal was common to the purposes of noise estimation and noise suppression. The output (b) corresponds to a case that the extracting frame length was set at 32 ms, and the output (c) corresponds to a case that the extracting frame length was set at 256 ms. Symbols (d) and (e) denote noise-suppressed outputs of the noise suppressing method according to the invention in which the extracting frame length for noise estimation (T2) and that for noise suppression (T1) were set at 256 ms and 32 ms, respectively. The output (d) corresponds to a case that the dip elimination processing of the dip eliminating section 22 (see FIG. 3) was not performed, and the output (c) corresponds to a case that the dip elimination processing was performed. As shown in FIG. 6, degrees of attenuation from the original noise (a) were conventional method of (b): 20 dB;

conventional method of (c): 19 dB;

method of invention of (d) (without dip elimination processing): 36 dB; and method of invention of (e) (with dip elimination processing): 64 dB.

It is therefore concluded that the spectrum subtraction methods according to the invention of (d) and (e) provide greater noise suppression effects than the conventional spectrum subtraction methods of (b) and (c). Of the spectrum subtraction methods according to the invention, the noise suppression effect is greater in the case of (e) where the dip elimination processing is performed than in the case of (d) where the dip elimination processing is not performed.

Figure 7:
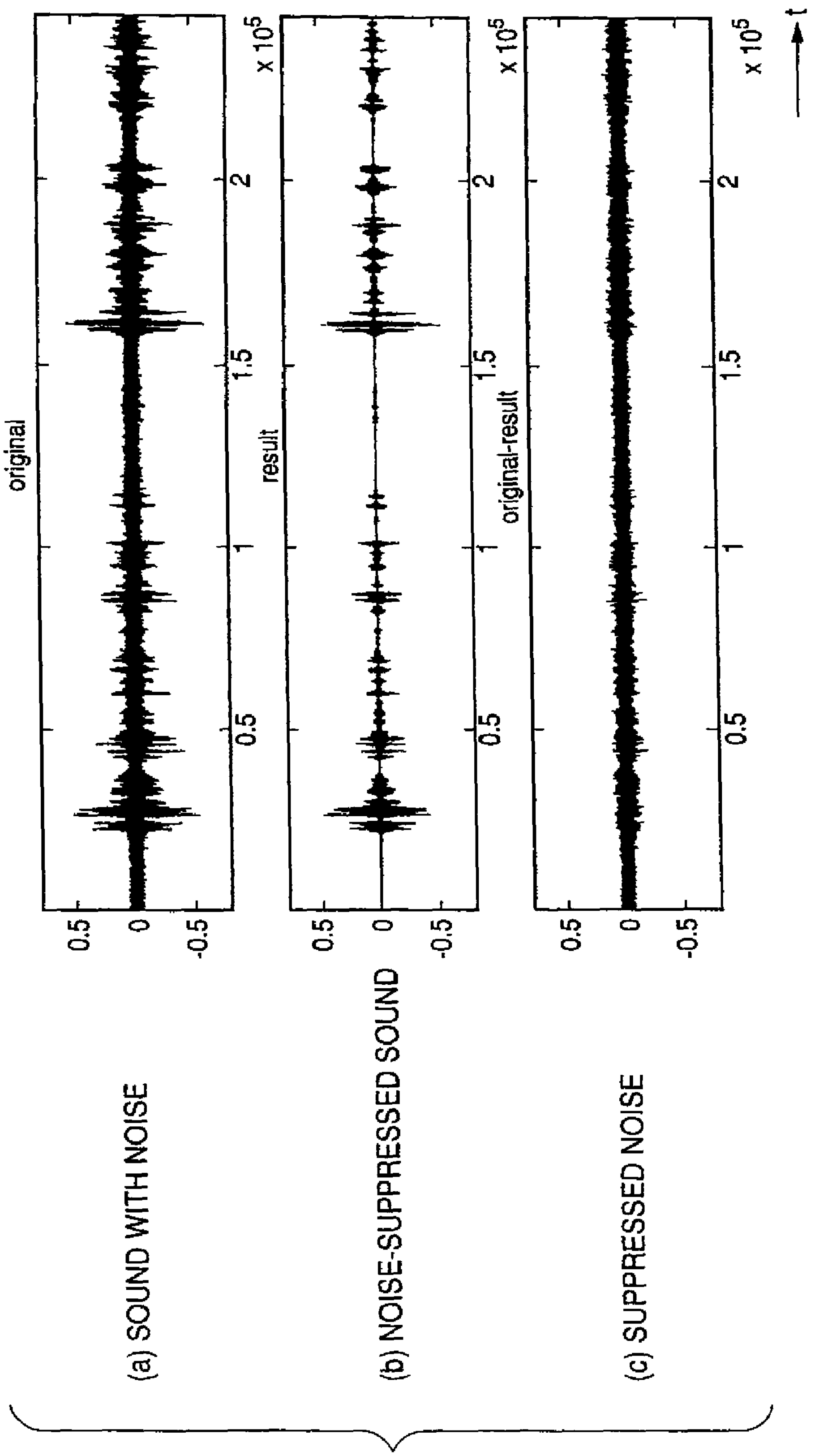
FIG. 7 is a waveform diagram of a case that a sound with noise is input to the noise suppressing apparatus according to the invention.

FIG. 7 is a waveform diagram of a case that a sound with noise is input to the noise suppressing apparatus according to the invention. In this case, the noise estimation frame length T2 is set at 256 ms and the noise suppression frame length T1 is set at 32 ms. Symbol (a) denotes a sound with noise. Symbol (b) denotes a noise-suppressed output. And symbol (c) denotes suppressed (eliminated) noise. It is seen from FIG. 7 that the sound (b) is obtained by suppressing the stationary noise (c) in the sound (a) with noise.

The above embodiments employ the amplitude spectrum subtraction method in which a noise amplitude spectrum $|N(k)|$ is estimated on the basis of an envelope $|X_2'(k)|$ of an amplitude spectrum $|X_2(k)|$ of an input signal and noise suppression is performed by subtracting the noise amplitude spectrum $|N(k)|$ from an amplitude spectrum $|X_1(k)|$ of the input signal. Alternatively, a power spectrum subtraction method may be employed in which a noise power spectrum $|N(k)|^2$ is estimated on the basis of an envelope $|X_2'(k)|^2$ of a power spectrum $|X_2(k)|^2$ of an input signal and noise suppression is performed by subtracting the noise power spectrum $|N(k)|^2$ from a power spectrum $|X_2(k)|^2$ of the input signal.

Although in the above embodiments the noise estimation processing is necessarily performed every prescribed time interval (every time T½ elapses), it may be performed every time a proper occasion arises. For example, a process may be employed in which intervals in which noise estimation can be performed easily such as silent intervals or faint sound intervals are detected in real time and the noise estimation processing is performed only in those intervals (i.e., the noise estimation processing is not performed (i.e., it is suspended) in the other intervals). The noise estimation processing may be suspended in intervals with a small noise variation or intervals in which reduction in processing load is desired. In these cases, in intervals in which the noise estimation processing is suspended, a process may be employed in which the data (noise amplitude spectrum $|N_0(K)|$) are not updated in the noise amplitude spectrum updating section 48 and the noise suppression processing is performed on the basis of a latest (i.e., immediately before the suspension) noise amplitude spectrum $|N_0(k)|$ held by the noise amplitude spectrum updating section 48.

Although the above embodiments are directed to the case of using FFT as a frequency analyzing method, the invention may employ frequency analyzing methods other than FFT.

In the above embodiments, the time window length in which to extract an observation signal for noise suppression (i.e., the noise suppression frame length T1, the period of M samples) is set longer than the cutting time interval (i.e., the period of M/2 samples) because overlap processing is performed in the output combining. The above two kinds of time intervals may be set identical if overlap processing is not performed.

Although the invention has been described above in detail in the form of the particular embodiments, it is apparent to those skilled in the art that various changes and modifications are possible without departing from the spirit, scope, or the range of intent of the invention.

The invention is based on the Japanese Patent application No. 2005-144744 filed on May 17, 2005, the disclosure of which is incorporated by reference herein.

The invention claimed is:

1. A noise suppressing method, comprising:

extracting a part of an observation signal that progresses with time and in which noise is superimposed on a sound, every time a prescribed interval of time with which the observation signal progresses elapses, in a first signal length that is longer than or equal to the prescribed time interval;

analyzing, as a first spectrum, a spectrum of the observation signal that is extracted in the first signal length;

extracting a part of the observation signal every time the prescribed time interval or a proper time elapses in a second signal length that is longer than the first signal length in such a manner that its head coincides with a head of the observation signal that is extracted in the first signal length;

analyzing, as a second spectrum, a spectrum of the observation signal that is extracted in the second signal length;

estimation-calculating a spectrum of noise included in the observation signal on the basis of the second spectrum;

subtracting the noise spectrum from the first spectrum every time the prescribed time interval elapses to calculate a noise-suppressed sound spectrum;

converting the calculated sound spectrum into a signal in the time domain every time the prescribed time interval elapses; and obtaining a continuous noise-suppressed sound by connecting the converted time-domain signals to each other, wherein the estimation-calculating process includes:

smoothing-processing the second spectrum;

comparing a smoothing-processed second spectrum with the second spectrum that is not smoothing-processed;

choosing larger values at respective frequency points in the comparing process to eliminate a dip in the second spectrum; and estimation-calculating a noise spectrum on the basis of a dip-eliminated second spectrum.

2. The noise suppressing method according to claim 1, comprising:

adding a zero signal having a prescribed length after an end of the observation signal that is extracted in the first signal length so that a signal length of the observation signal to be used for the analysis of the first spectrum is made equal to the second signal length;

analyzing, as a first spectrum, a spectrum of the observation signal to which the zero signal is added;

subtracting the noise spectrum from the analyzed first spectrum;

converting a sound spectrum that is obtained by the subtracting process into a signal in the time domain;

removing a signal having the same length as the added zero signal located after an end of the time-domain signal, to return a signal length of the time-domain signal to the first signal length; and connecting the time-domain signals to each other whose signal length is returned to the first signal length.

3. The noise suppressing method according to claim 1, wherein the prescribed time interval is a half of the first signal length.

4. The noise suppressing method according to claim 3, wherein the time-domain signal is a signal that is obtained in the first signal length every time the prescribed time interval elapses, and wherein the time-domain signal is multiplied by a triangular window and the time-domain signals that are multiplied by the triangular window are added to each other sequentially and thereby connected to each other.

5. A noise suppressing method, comprising:

extracting a part of an observation signal that progresses with time and in which noise is superimposed on a sound, every time a prescribed interval of time with which the observation signal progresses elapses, in a first signal length that is longer than or equal to the prescribed time interval;

analyzing, as a first spectrum, a spectrum of the observation signal that is extracted in the first signal length;

extracting a part of the observation signal every time the prescribed time interval or a proper time elapses in a second signal length that is longer than the first signal length in such a manner that its head coincides with a head of the observation signal that is extracted in the first signal length:

analyzing, as a second spectrum, a spectrum of the observation signal that is extracted in the second signal length;

estimation-calculating a spectrum of noise included in the observation signal on the basis of the second spectrum;

subtracting the noise spectrum from the first spectrum every time the prescribed time interval elapses to calculate a noise-suppressed sound spectrum;

converting the calculated sound spectrum into a signal in the time domain every time the prescribed time interval elapses; and obtaining a continuous noise-suppressed sound by connecting the converted time-domain signals to each other, wherein the subtracting process includes:

smoothing-processing the estimated noise spectrum;

comparing a smoothing-processed noise spectrum with the noise spectrum that is not smoothing-processed;

choosing larger values at respective frequency points in the comparing process to eliminate a dip in the noise spectrum; and subtracting a dip-eliminated noise spectrum from the first spectrum.

6. The noise suppressing method according to claim 5, comprising:

adding a zero signal having a prescribed length after an end of the observation signal that is extracted in the first signal length so that a signal length of the observation signal to be used for the analysis of the first spectrum is made equal to the second signal length;

analyzing, as a first spectrum, a spectrum of the observation signal to which the zero signal is added;

subtracting the noise spectrum from the analyzed first spectrum;

converting a sound spectrum that is obtained by the subtracting process into a signal in the time domain;

removing a signal having the same length as the added zero signal located after an end of the time-domain signal, to return a signal length of the time-domain signal to the first signal length; and connecting the time-domain signals to each other whose signal length is returned to the first signal length.

7. The noise suppressing method according to claim 5, wherein the prescribed time interval is a half of the first signal length.

8. The noise suppressing method according to claim 7, wherein the time-domain signal is a signal that is obtained in the first signal length every time the prescribed time interval elapses, and wherein the time-domain signal is multiplied by a triangular window and the time-domain signals that are multiplied by the triangular window are added to each other sequentially and thereby connected to each other.

9. A noise suppressing apparatus, comprising:

a first signal extracting section which extracts a part of an observation signal that progresses with time and in which noise is superimposed on a sound, every time a prescribed interval of time with which the observation signal progresses elapses, in a first signal length that is longer than or equal to the prescribed time interval;

a first spectrum analyzing section which analyzes, as a first spectrum, a spectrum of the observation signal that is extracted by the first signal extracting section;

a second extracting section which extracts a part of the observation signal every time the prescribed time interval or a proper time elapses in a second signal length that is longer than the first signal length in such a manner that its head coincides with a head of the observation signal that is extracted in the first signal length;

a second spectrum analyzing section which analyzes, as a second spectrum, a spectrum of the observation signal that is extracted by the second signal extracting section;

a noise spectrum estimation-calculating section which estimation-calculates a spectrum of noise included in the observation signal on the basis of the second spectrum;

a subtracting section which subtracts the noise spectrum from the first spectrum every time the prescribed time interval elapses, to calculate a noise-suppressed sound spectrum;

a conversion-into-time-domain section which converts the calculated sound spectrum into a signal in the time domain every time the prescribed time interval elapses; and an output combining section which obtains a continuous noise-suppressed sound by connecting the converted time-domain signals to each other, wherein the noise spectrum estimation-calculation section smoothes the second spectrum, compares a smoothed second spectrum with the second spectrum that is not smoothed, chooses larger values at respective frequency points in the comparing process to eliminate a dip in the second spectrum, and estimation-calculates a noise spectrum on the basis of a dip-eliminated second spectrum.

10. A noise suppressing method for obtaining, from an observation signal in which noise is superimposed on a sound, a sound in which the noise is suppressed, comprising:

analyzing a spectrum of the observation signal;

smoothing-processing the observation signal spectrum;

comparing the smoothing-processed observation signal spectrum with the observation signal spectrum that is not smoothing-processed;

choosing larger values at respective frequency points in the comparing process, to eliminate a dip from the observation signal spectrum;

estimation-calculating a noise spectrum on the basis of a dip-eliminated observation signal spectrum;

subtracting the noise spectrum from the observation signal spectrum, to calculate a sound spectrum in which the noise is suppressed; and converting the sound spectrum into a signal in the time domain.

11. A noise suppressing method for obtaining, from an observation signal in which noise is superimposed on a sound, a sound in which the noise is suppressed, comprising:

analyzing a spectrum of the observation signal;

estimation-calculating a noise spectrum on the basis of the observation signal spectrum;

smoothing-processing the estimated noise spectrum;

comparing a smoothing-processed noise spectrum with the noise spectrum that is not smoothing-processed;

choosing larger values at respective frequency points in the comparing process, to eliminate a dip from the noise spectrum;

subtracting the noise spectrum from the observation signal spectrum, to calculate a sound spectrum in which the noise is suppressed; and converting the sound spectrum into a signal in the time domain.

12. A noise suppressing apparatus, comprising:

a first signal extracting section which extracts a part of an observation signal that progresses with time and in which noise is superimposed on a sound, every time a prescribed interval of time with which the observation signal progresses elapses, in a first signal length that is longer than or equal to the prescribed time interval;

a first spectrum analyzing section which analyzes, as a first spectrum, a spectrum of the observation signal that is extracted by the first signal extracting section;

a second extracting section which extracts a part of the observation signal every time the prescribed time interval or a proper time elapses in a second signal length that is longer than the first signal length in such a manner that its head coincides with a head of the observation signal that is extracted in the first signal length;

a second spectrum analyzing section which analyzes, as a second spectrum, a spectrum of the observation signal that is extracted by the second signal extracting section;

a noise spectrum estimation-calculating section which estimation-calculates a spectrum of noise included in the observation signal on the basis of the second spectrum;

a subtracting section which subtracts the noise spectrum from the first spectrum every time the prescribed time interval elapses to calculate a noise-suppressed sound spectrum;

a conversion-into-time-domain section which converts the calculated sound spectrum into a signal in the time domain every time the prescribed time interval elapses; and an output combining section which obtains a continuous noise-suppressed sound by connecting the converted time-domain signals to each other, wherein the subtracting section smoothes the estimated noise spectrum, compares a smoothed noise spectrum with the noise spectrum that is not smoothed, chooses larger values at respective frequency points in the comparing process to eliminate a dip in the noise spectrum, and subtracts a dip-eliminated noise spectrum from the first spectrum.

* * * * *

UNITED STATES PATENT AND TRADEMARK OFFICE

CERTIFICATE OF CORRECTION

PATENT NO. : 8,160,732 B2
APPLICATION NO. : 11/914550
DATED : April 17, 2012
INVENTOR(S) : Michiko Kazama et al.

It is certified that error appears in the above-identified patent and that said Letters Patent is hereby corrected as shown below:

Title Page, Item (73) should read;

(73) Assignees: Yamaha Corporation, Hamamatsu-shi (JP);
Waseda University, Tokyo (JP)

Signed and Sealed this
Twenty-sixth Day of February, 2013

Teresa Stanek Rea
*Acting Director of the United States Patent and Trademark Office*